(12) United States Patent
Kuyper et al.

(10) Patent No.: US 10,562,633 B2
(45) Date of Patent: Feb. 18, 2020

(54) AIRCRAFT PASSENGER SUITE PRIVACY SCREEN CONTROL APPARATUS AND METHOD

(71) Applicant: B/E Aerospace, Inc., Wellington, FL (US)

(72) Inventors: John Kuyper, Tucson, AZ (US); Ian L. Frost, Tucson, AZ (US)

(73) Assignee: B/E Aerospace, Inc., Winston-Salem, NC (US)

( * ) Notice: Subject to any disclaimer, the term of this patent is extended or adjusted under 35 U.S.C. 154(b) by 679 days.

(21) Appl. No.: 15/294,014

(22) Filed: Oct. 14, 2016

(65) Prior Publication Data
US 2017/0106980 A1 Apr. 20, 2017

Related U.S. Application Data

(60) Provisional application No. 62/241,409, filed on Oct. 14, 2015.

(51) Int. Cl.
*B64C 11/06* (2006.01)
*B64D 11/06* (2006.01)

(52) U.S. Cl.
CPC ...... *B64D 11/0606* (2014.12); *B64D 11/0602* (2014.12); *B64D 11/0604* (2014.12)

(58) Field of Classification Search
CPC ............ B64D 11/0606; B64D 11/0605; B64D 11/0604; B64D 11/0602; B64C 1/1438; B64C 1/1469; B64C 1/1423; E06B 3/4654
See application file for complete search history.

(56) References Cited

U.S. PATENT DOCUMENTS

| | | | | |
|---|---|---|---|---|
| 2,653,022 A | * | 9/1953 | Armstrong | E05F 15/643 49/118 |
| 4,503,637 A | * | 3/1985 | Parente | E06B 3/5072 49/118 |
| 5,873,205 A | * | 2/1999 | Hanlon | E04B 2/7416 49/158 |
| 7,934,679 B2 | * | 5/2011 | Bock | B64D 11/0606 244/118.6 |
| 9,981,732 B2 | * | 5/2018 | Goings | B64D 11/0023 |
| 2009/0307980 A1 | * | 12/2009 | Hemmings | E05D 15/0686 49/360 |

* cited by examiner

*Primary Examiner* — Richard R. Green
(74) *Attorney, Agent, or Firm* — Clements Bernard Walker (57) ABSTRACT

A control assembly for a pocket-style screen or door. Top and bottom guide rollers carried by the screen travel along adjustable guide rails mounted in the pocket. A magnet assembly includes a stationary magnet mounted in the pocket wall arranged to attract a moveable magnet carried on a cable to facilitate final opening and closing the screen. A damper cooperates with the magnet assembly to decrease the velocity of the screen as it moves into stowed and deployed positions.

18 Claims, 15 Drawing Sheets

AIRCRAFT PASSENGER SUITE PRIVACY SCREEN CONTROL APPARATUS AND METHOD

CROSS-REFERENCE TO RELATED APPLICATION

This application claims priority from U.S. Application No. 62/241,409 filed Oct. 14, 2015, the entirety of which is incorporated by reference herein.

TECHNICAL FIELD AND BACKGROUND OF THE INVENTION

The present invention relates generally to a control apparatus for a privacy screen, for example, of the type utilized in an aircraft passenger suite, and more particularly, to a control apparatus including adjustable guides, a magnet arrangement and a cable arrangement for controlling adjustments, tensioning, dampening, and movement of a privacy screen or like structure.

Premium class passenger cabins are frequently equipped with private suites that include facilities for sitting, reclining, sleeping in a lay flat position, dining and working. These suites are sometimes equipped with a privacy screen or door that permits the ingress/egress screen to be open or closed as required. Because of limited space, a "pocket" type sliding screen may be desirable. With these screens, it is important to provide a mechanism that is robust, reliable, easily maintained and adjusted, and that operates in a smooth manner in keeping with its presence in a premium class area of the aircraft.

BRIEF SUMMARY OF THE INVENTION

It is therefore an object of the invention to provide a sliding privacy screen configured for use in an aircraft passenger suite.

It is another object of the invention to provide a sliding privacy screen that floats within a roller and guide system that allows for rotational and translational adjustment.

It is another object of the invention to provide a cable and pulley system for tensioning the screen.

It is another object of the invention to provide a damper assembly utilizing magnets and cables to provide soft open and close features for the screen.

It is another object of the invention to provide a double latch system to allow crew to lock the privacy screen in the stowed position, including an embodiment that features a magnet coupling system.

It is another object of the invention to provide a privacy screen system that is easy to adjust and compact.

It is another object of the invention to provide a screen system that is applicable and beneficial to pocket style screens and doors.

It is another object of the invention to provide a screen system that can also be adapted to overhung style screens and doors.

It is another object of the invention to provide a magnetic soft open and close feature applicable to any sliding door, screen, drawer, tray, etc.

To achieve the foregoing and other objects and advantages, in one embodiment the present invention provides a screen control apparatus including a screen movable between a stowed position within a pocket and a deployed position outside of the pocket, at least one guide roller carried on the screen arranged to travel along at least one guide rail mounted in the pocket, a cable routed around a plurality of pulleys rotatably mounted within the pocket, the cable secured to the screen, a magnet assembly including a stationary magnet mounted within the pocket and a moveable magnet carried on the cable, the moveable magnet movable into and out of magnetic attraction with the stationary magnet as the screen moves between the stowed and deployed positions, and a damper assembly mounted within the pocket operable for controlling cable velocity.

In a further embodiment, the pocket can be located within a wall of an aircraft passenger suite, the pocket having a vertical opening facing across an entrance to the passenger suite.

In a further embodiment, the at least one guide roller can include a top roller rotatably mounted proximate a top of the screen and a bottom roller rotatably mounted proximate a bottom of the screen, the top roller arranged to travel along a top guide mounted within the pocket above the screen, and the bottom roller arranged to travel along a bottom guide mounted within the pocket below the screen.

In a further embodiment, the at least one guide roller can include a middle roller rotatably mounted proximate a face of the screen, the middle roller arranged to travel along a middle guide mounted within the pocket between the top and bottom guides.

In a further embodiment, the at least one guide rail can be an elongate linear member adjustable at one or both ends to adjust at least one of screen position and trajectory.

In a further embodiment, the apparatus can include a top cable block securing the cable to the screen proximate a top of the screen, and a bottom cable block securing the cable to the screen proximate a bottom of the screen, the top and bottom cable blocks moveable with the screen.

In a further embodiment, the apparatus can include a glide sheet arranged between the stationary magnet and the moveable magnet, the glide sheet having a wear surface controlling a distance between the moveable magnet and the stationary magnet.

In a further embodiment, the cable can include an in-line turnbuckle for adjusting cable tension.

In a further embodiment, the damper assembly can include a plurality of pulleys around which the cable is routed along a non-linear pathway.

In a further embodiment, the stationary magnet can be a female conical-shaped magnet and the moveable magnet can be a male conical-shaped magnet mounted on the cable, and wherein the stationary magnet is mounted in a tubular guide through which the cable passes.

In a further embodiment, the screen can be a door, shade, window, or any other rigid or flexible structure adapted to slide between stowed and deployed positions.

According to another embodiment, the present invention provides an aircraft passenger suite including a plurality of walls, an entrance located between spaced ones of the plurality of walls, a pocket located within one of the plurality of walls, the pocket having a vertical opening facing across the entrance, a screen movable between a stowed position within the pocket and a deployed position outside of the pocket, at least one guide roller carried on the screen arranged to travel along at least one guide rail mounted in the pocket, a cable routed around a plurality of pulleys rotatably mounted within the pocket, the cable secured to the screen, a magnet assembly including a stationary magnet mounted within the pocket and a moveable magnet carried on the cable, the moveable magnet movable into and out of magnetic attraction with the stationary magnet as the screen moves between the stowed and deployed positions, and a damper assembly mounted within the pocket operable for controlling cable velocity.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
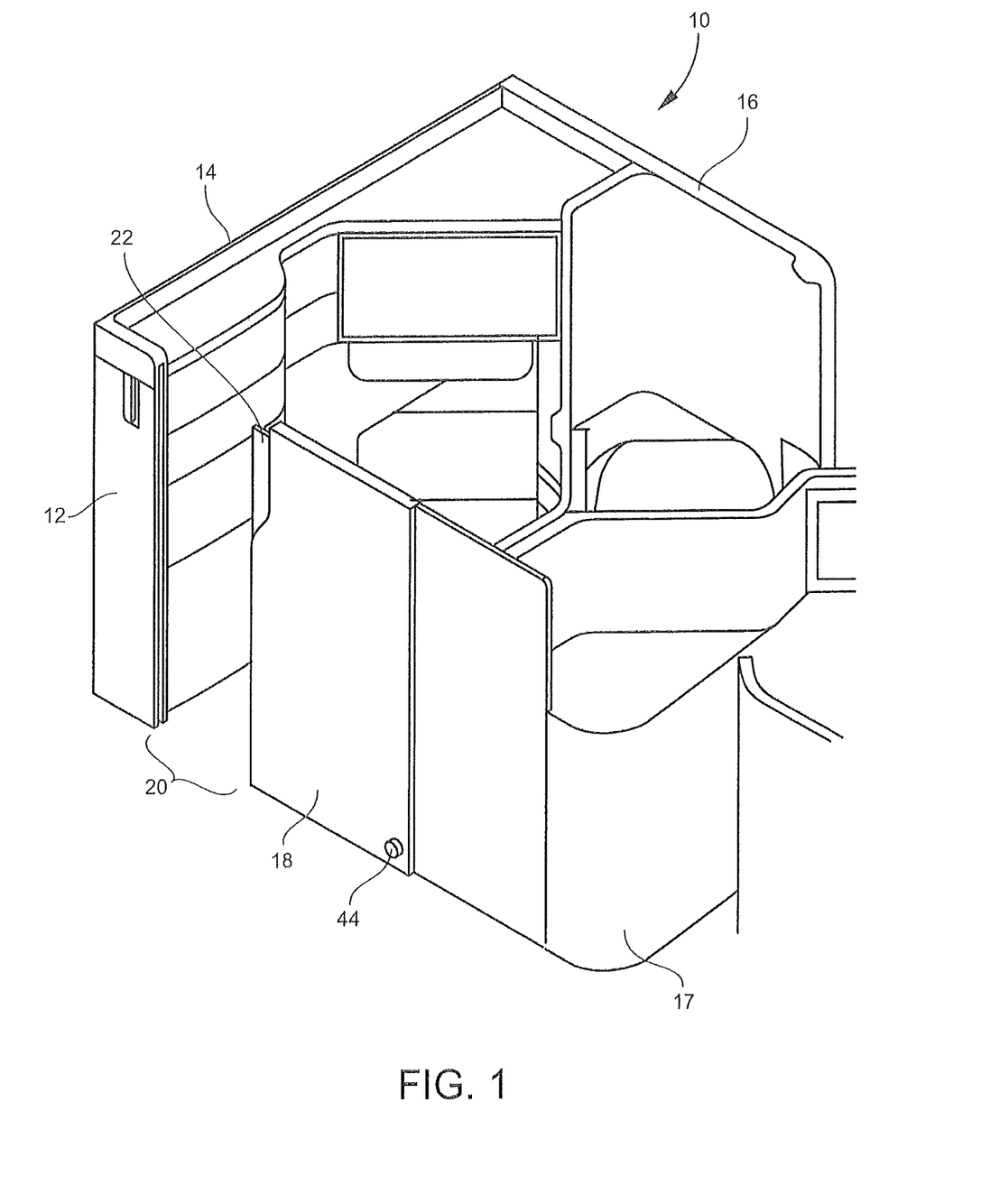
FIG. 1 is a perspective view of a passenger suite equipped with a sliding pocket screen according to an embodiment of the invention, shown with the screen stowed.
Figure 2:
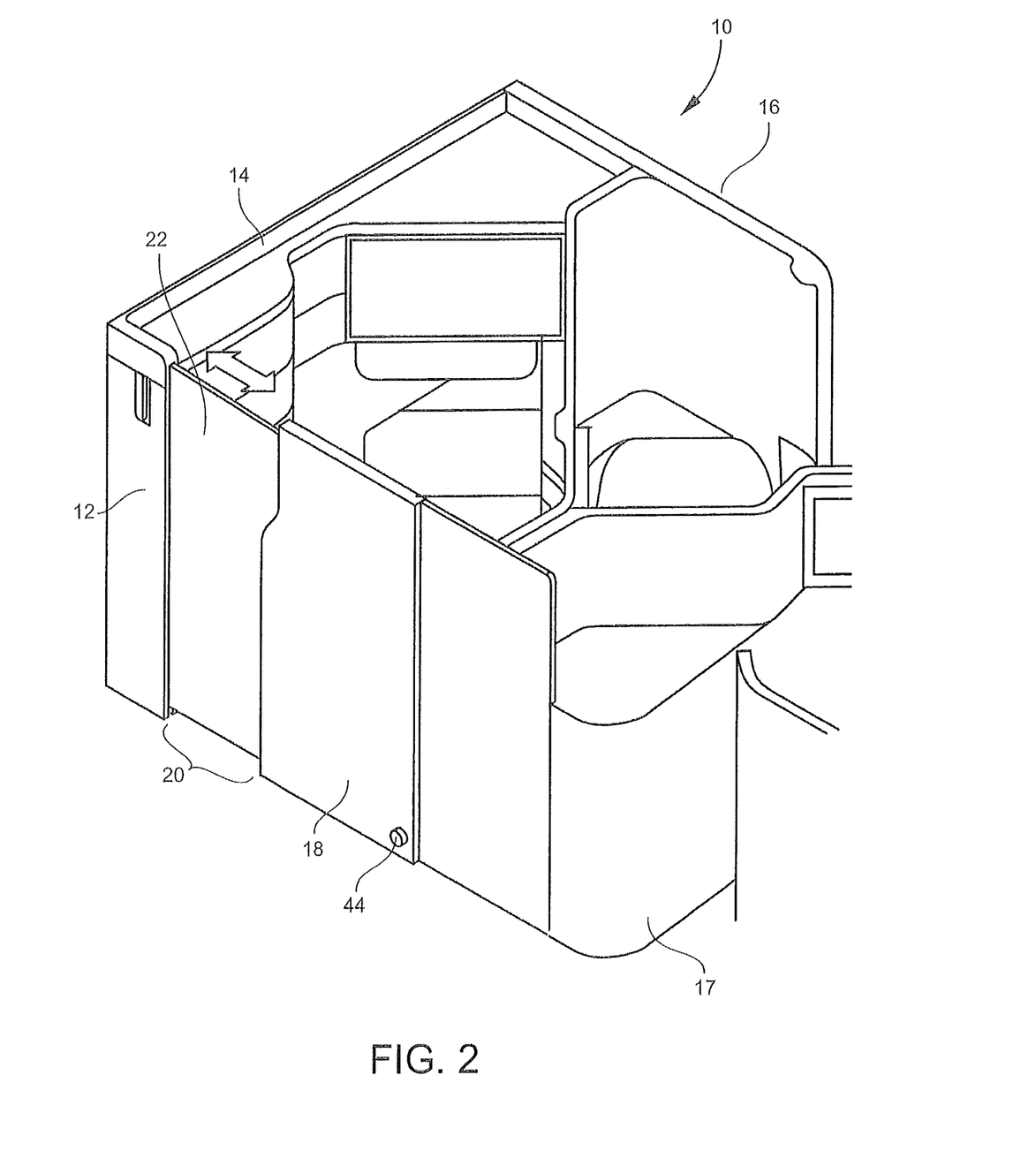
FIG. 2 is a perspective view of the passenger suite shown with the screen deployed.

Referring now to FIGS. 1 and 2, an exemplary passenger suite 10 suitable for use in a seating arrangement in an airliner or other conveyance is shown generally at reference numeral 10. The suite 10 generally includes a screen 22 that, when deployed, closes off access between the interior of the suite 10 and other areas of the cabin, such as the aisles. The screen 22 can also be a door, shade, window, or any other rigid or flexible structure capable of moving, for example sliding, between stowed and deployed positions. The screen 22 can serve to provide one or more of privacy, shade, ventilation, etc.

The passenger suite 10 further includes walls 12, 14, 16, 17, and 18, within which is located, variously, an adjustable seat, ottoman, table, entertainment equipment, controls, storage area, etc. These specific items are not, per se, part of the invention and thus are not described further. Examples of such passenger suites are disclosed in applicant's U.S. Pat. Nos. 7,578,471 and 8,662,447. The inventive screen control apparatus and method described herein has application for uses other than in transportation modes.

The suite 10 includes an access opening 20 or entrance between the walls 12 and 18 for passenger and crew ingress and egress. The access opening 20 is opened and closed as desired by movement of the screen 22, which slides into the wall 18 to open the access opening 20, as shown in FIG. 1, and out of the wall 18 to close the access opening 20 and thus close off access to the suite 10, as shown in FIG. 2. Thus, FIG. 1 shows the screen 22 in a "stowed" or "open" position, and FIG. 2 shows the screen 22 in a "deployed" or "closed" position. A latch 44, as described in detail below, operates to hold the screen 22 in the stowed position.

Figure 3:
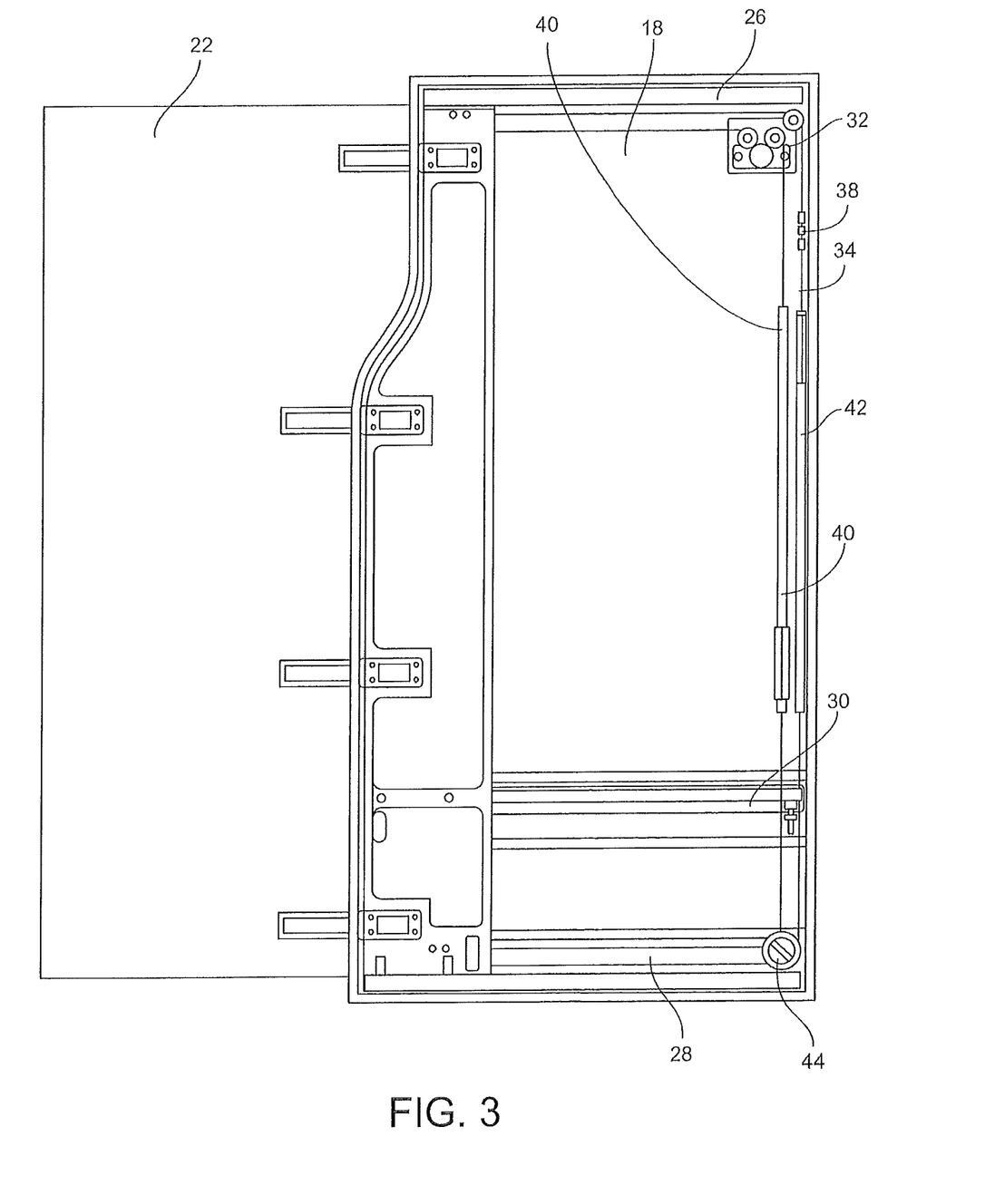
FIG. 3 is a side elevation with parts broken away, shown with the screen deployed.

As shown in FIG. 3, wall 18 includes an interior "pocket" accessed through a vertically-extending opening. The screen 22 is mounted for sliding movement into and out of the pocket through the opening. The movement of the screen 22 is guided and controlled by way of a top guide rail 26 and a bottom guide rail 28 on which the respective top and bottom surfaces of the screen 22 ride. A middle guide rail 30 positioned between the top guide rail 26 and bottom guide rail 28, for example nearer the bottom rail 28, provides stability and improved motion control to the screen 22. Each of the top, bottom and middle guide rails 26, 28, 30 can have a U-shaped cross-section wherein the top guide rail 26 opens downward, the bottom guide rail 28 opens upward, and the middle guide rail 30 opens in a direction of the screen 22.

A damper assembly 32 operates to controls the velocity of a cable 34. As show, the damper assembly 32 includes a plurality of pulleys around which the cable 34 is routed along a non-linear path. Adjustable cable tensioners 38 and 40 provide tension to the cable 34. A magnet system 42, as described in detail below, urges the screen 22 to remain in either the stowed or deployed position. The crew latch 44 located near the bottom of wall 18 permits a crew member to latch the screen in the stowed position, for example, for taxi, take-off and landing (TTOL).

Figure 4:
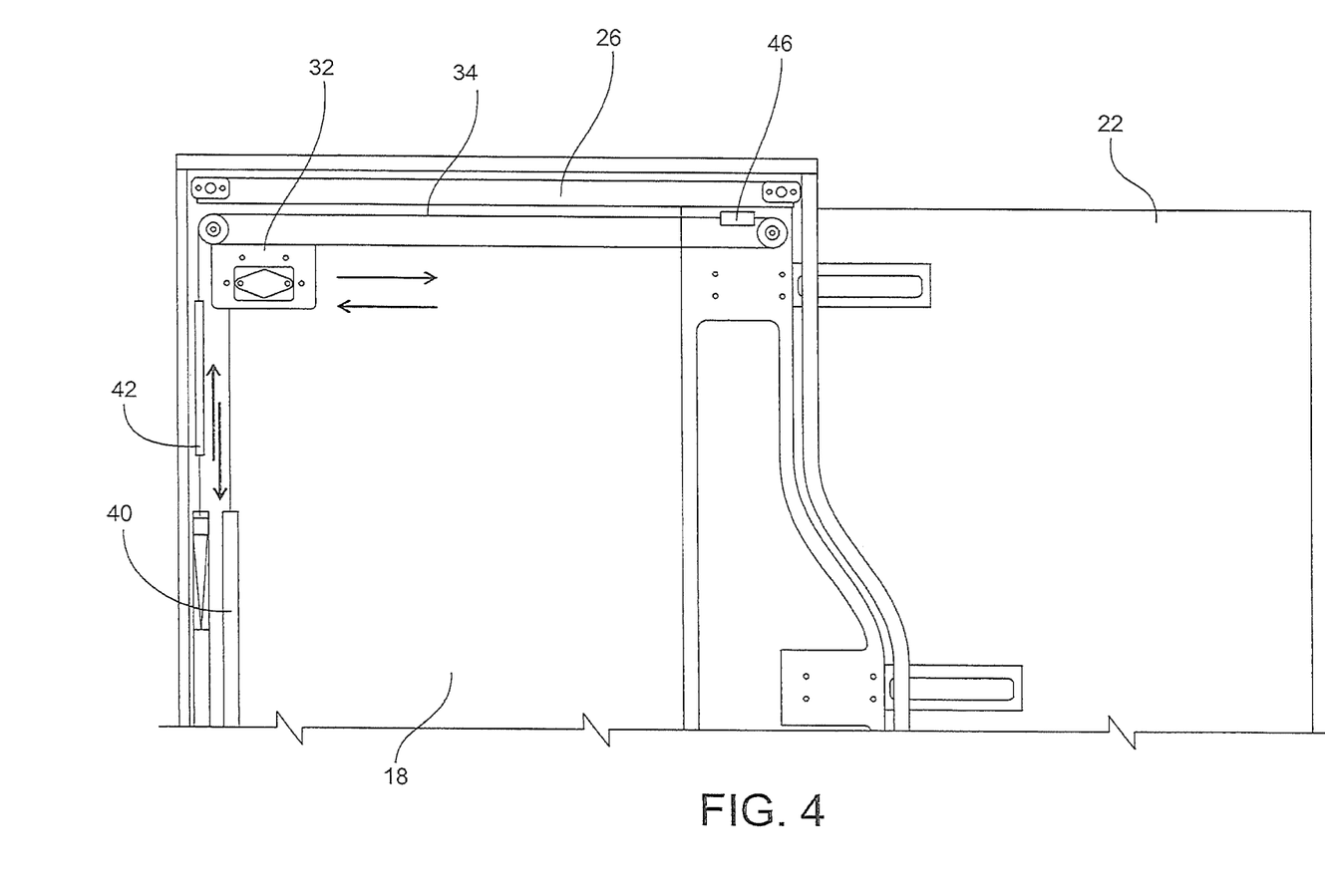
FIG. 4 is an enlarged, fragmentary side elevation from the reverse side shown in FIG. 3, shown with the screen deployed.
Figure 5:
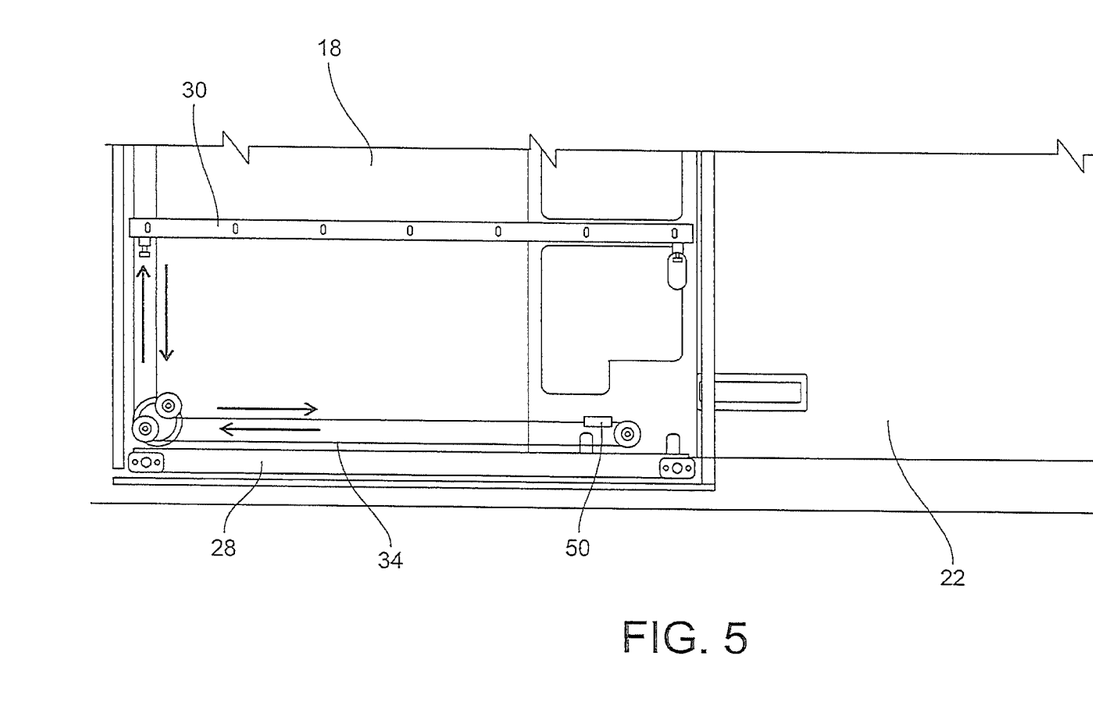
FIG. 5 is an enlarged, fragmentary side elevation of the bottom portion of the screen shown deployed.

FIG. 4 shows a first or "upper" cable block 46 secured near a top of the screen 22. When a passenger deploys the screen 22, such as by pulling on the screen, the screen 22 pulls the cable block 46 along therewith, thereby pulling the cable 34. Cable velocity is controlled by the damper assembly 32 and the routed cable. The cable 34 also moves the attached magnet system 42. As shown in FIG. 5, the cable 34 also moves a second cable block 50 attached to the screen 22, which moves the bottom of the screen 22. The cable 34 can be continuous and is generally routed along the top, bottom, and inner sides of the pocket, around a series of vertically oriented pulleys and through the damper assembly 32.

Figure 6:
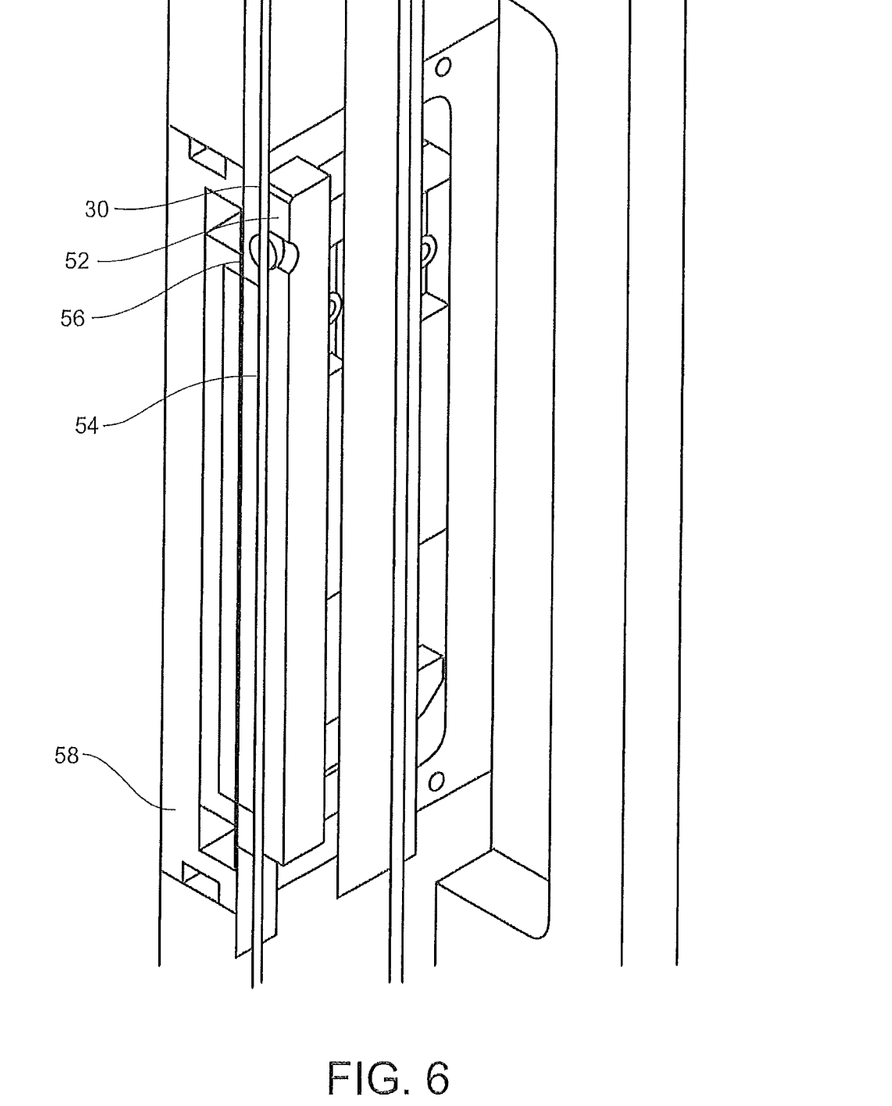
FIG. 6 is a perspective view of the cable magnet carriage.
Figure 7:
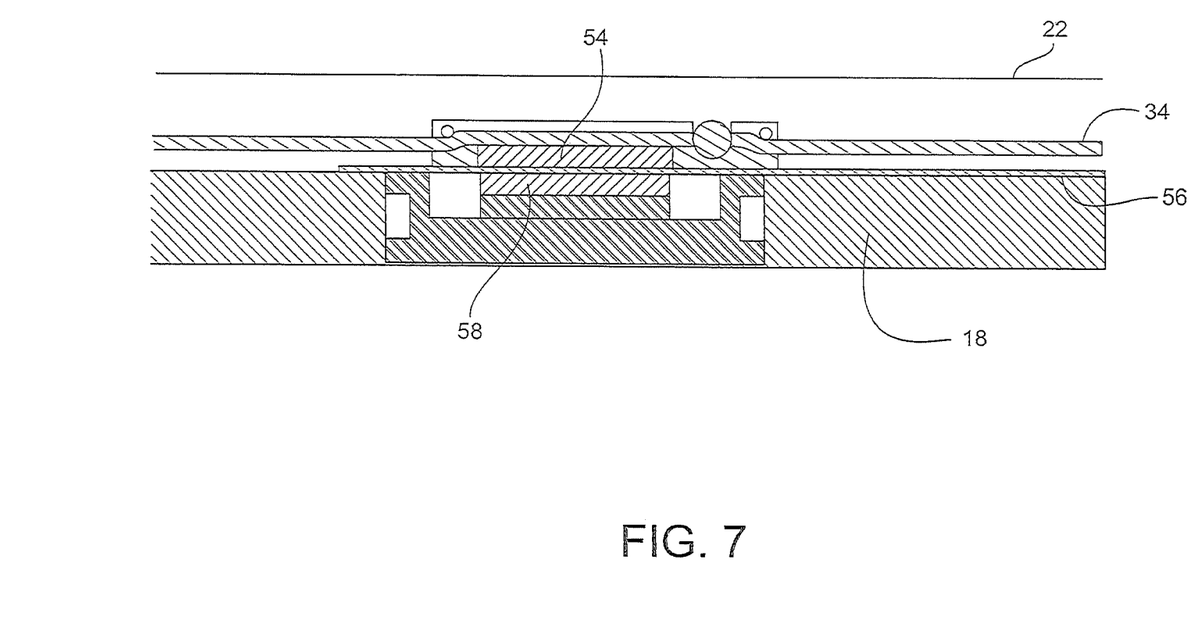
FIG. 7 is a section view through the cable magnet carriage.

As shown in FIG. 6, the cable 34 moves an attached cable magnet carriage 52 on which is mounted a cable magnet 54. This assembly glides over a glide sheet 56 that provides a wear surface and controls the distance between the cable magnet 54 and a stationary magnet 58 mounted as part of the magnet system 42. The cable magnet 54 can be wedge-shaped to provide linear attraction as the cable magnet 54 approaches the stationary magnet 58. Further details of the magnet system 42 are shown in FIG. 7.

Figure 8:
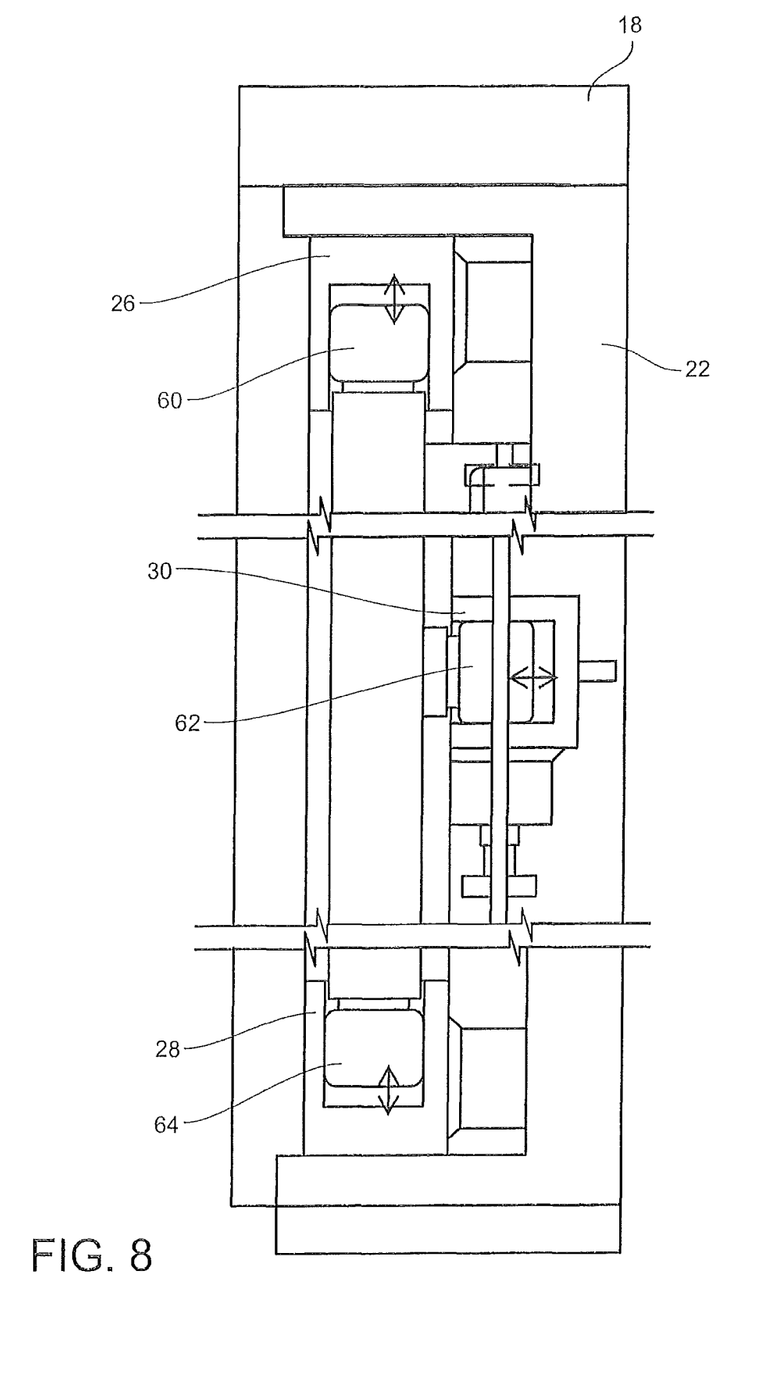
FIG. 8 is a fragmentary vertical end elevation showing guide and rollers that determine the screen's left/right and up/down angle, position and trajectory.

Referring to FIG. 8, a horizontally-oriented top guide roller 60 mounted on the top of the screen 22 rolls within/along the top guide rail 26, a vertically-oriented middle guide roller 62 mounted on a side of the screen 22 rolls within/along the middle guide rail 30, and a horizontally-oriented bottom guide roller 64 rolls within/along the bottom guide rail 28, as shown. The roller and guide channel arrangement facilitates and guides smooth horizontal translation of the screen 22.

Figure 9:
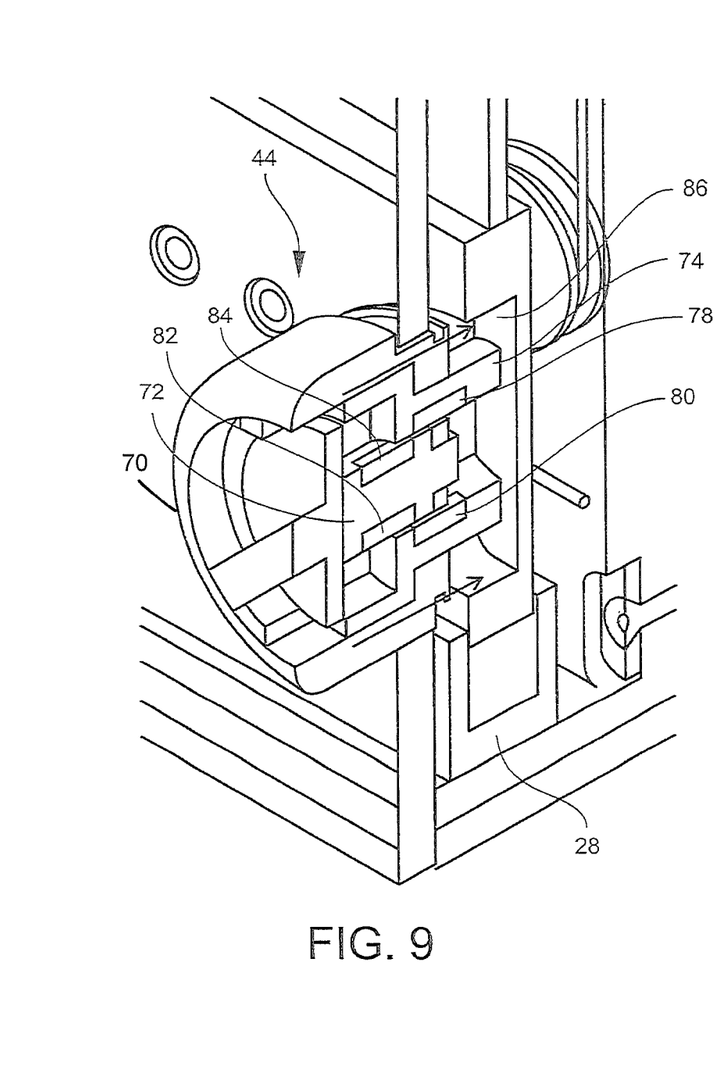
FIG. 9 is an enlarged, fragmentary view with parts broken away of the crew latch for locking screen position, shown with the latch locked.
Figure 10:
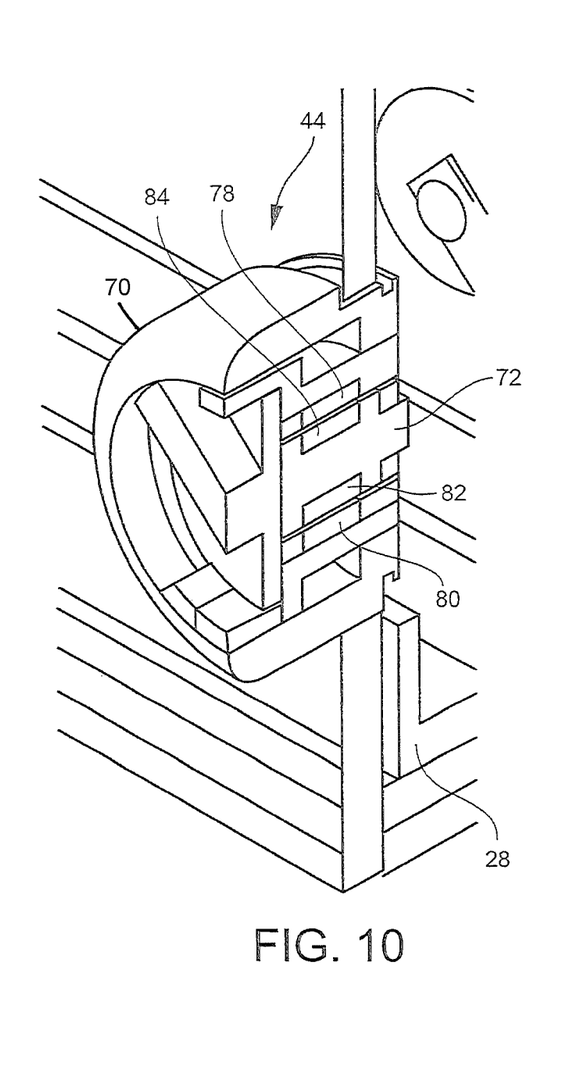
FIG. 10 is an enlarged, fragmentary view with parts broken away of the latch showing the latch unlocked.

FIGS. 9 and 10 show the respective "locked" and "unlocked" configurations of the crew latch 44. The crew latch 44 can be mounted in the lower corner of the wall 18 away from the vertical opening to the pocket, as shown in FIGS. 1-3. The latch 44 includes a handle 72 rotatably mounted in a latch housing 70. A pair of bolts 74, 76 contain respective bolt magnets 78, 80. The handle 72 contains handle magnets 82, 84. The handle magnets 82, 84 are placed with opposing magnetic poles at 90 degrees to each other. When the handle 72 is rotated, the handle magnets 82, 84 repel or attract the magnets 78, 80, depending on the rotation direction of the handle 72. For example, clockwise rotation may repel the magnets 78, 80, while counterclockwise rotation may attract the magnets 78, 80. Attraction between the handle magnets 82, 84 and bolt magnets 74, 76 pulls the bolts 74, 76 out of a slot 86 formed in the screen 22, thus unlocking the screen 22 and allowing deployment as shown in FIG. 10. When rotated further, or in the opposite direction, the handle magnets 82, 84 repel the bolt magnets 74, 76, thereby pushing the bolts into the slot 86, thus locking the screen 22 in the fully stowed position shown in FIG. 9.

Figure 11:
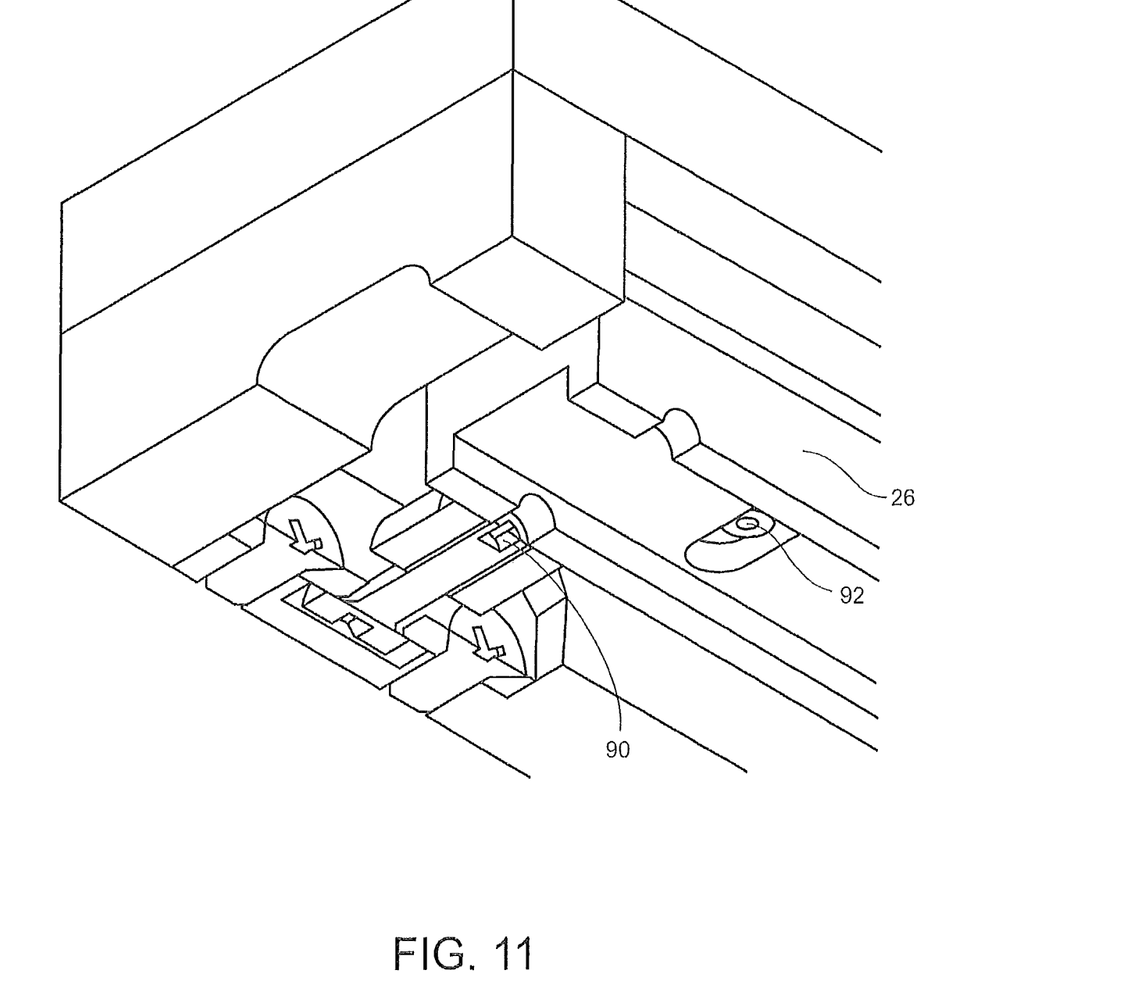
FIG. 11 is a fragmentary view of the top guide positioning and trajectory adjustment.
Figure 12:
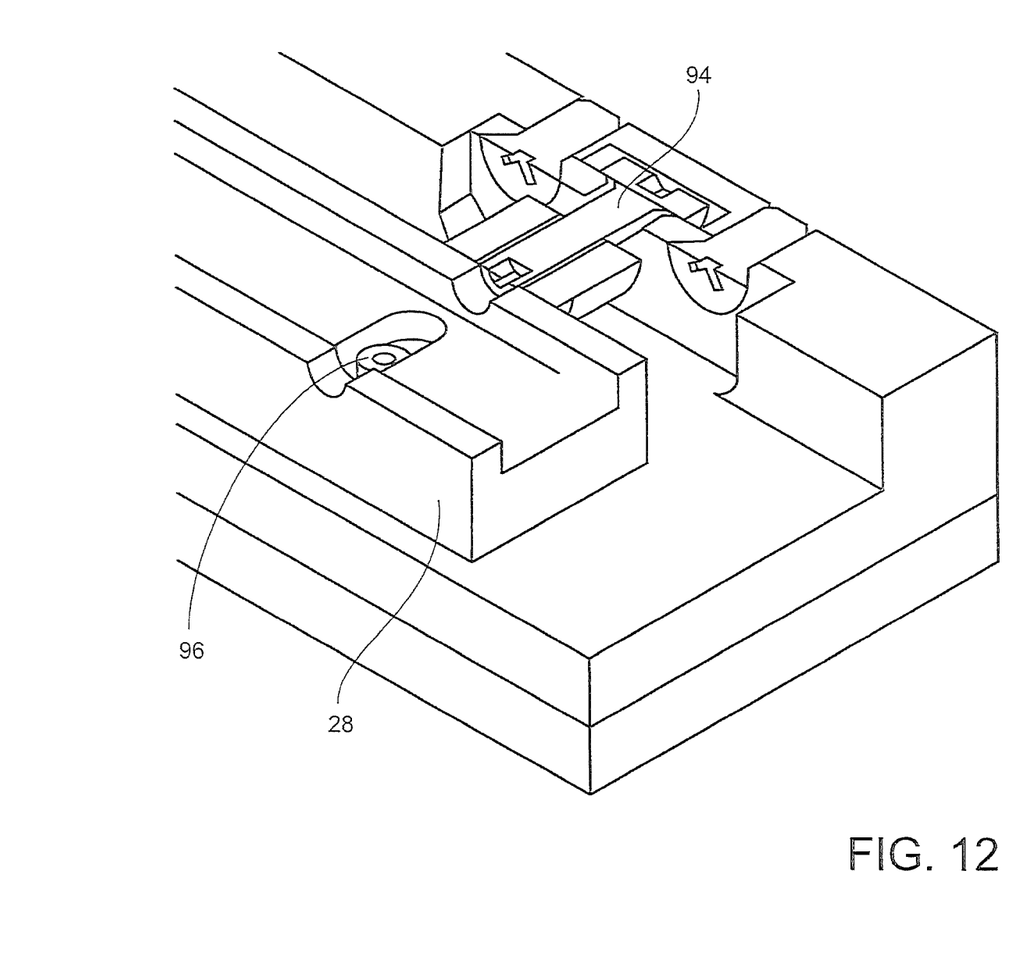
FIG. 12 is a fragmentary view of the bottom guide positioning and trajectory adjustment.
Figure 13:
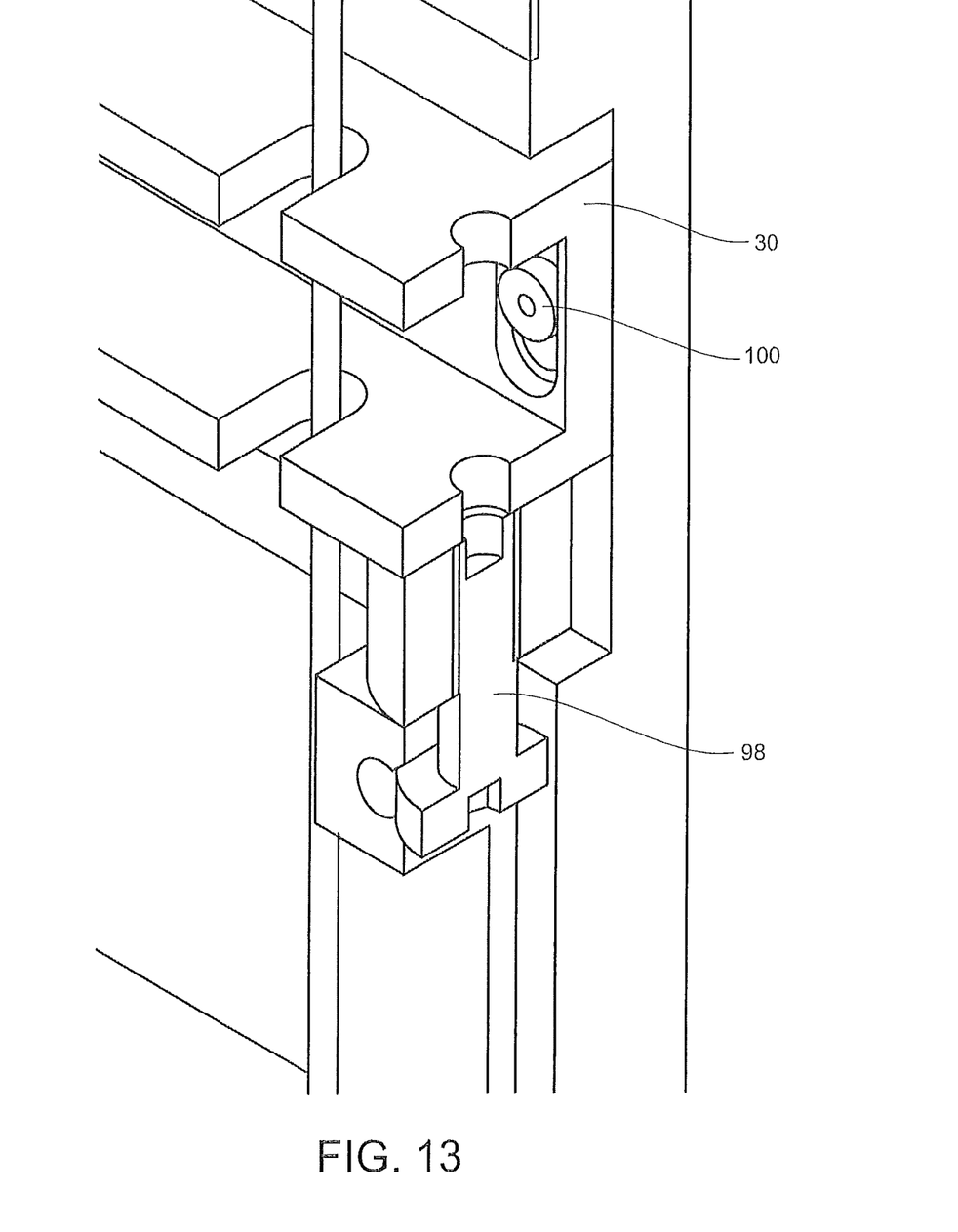
FIG. 13 is a fragmentary view of the middle guide positioning and trajectory adjustment.

Referring to FIGS. 11, 12 and 13, screen adjustment and trajectory is controlled by adjusting the position and angle of the top guide rail 26, bottom guide rail 28, and middle guide rail 30. The top guide rail 26 is adjusted, as shown in FIG. 11, by way of an adjuster screw 90 positioned near one end of the top guide rail 26, which can be turned by, for example, a hex key or other tool. The screw 90 turns to move one end of the guide rail 26 in or out depending on the direction turned. Another adjuster screw, not shown, at the other end of the top guide rail 26 performs a similar function. Adjusting only one of the adjuster screws yaws the tope guide rail 26, while adjusting both adjuster screws translates the top guide rail 26. Once the adjustment is made by the screw 90, a low profile shoulder bolt 92 can be tightened to lock the adjusted position in place.

Adjustment of the bottom guide rail 28 is shown in FIG. 12. In a manner similar to adjustment of the top guide rail 26, an adjuster screw 94 turns to move one end of the bottom guide rail 28 into a desired position. Another adjuster screw, not shown, located at the other end of the bottom guide rail 28 performs a similar function. Again, adjusting only one of the adjuster screws yaws the bottom guide rail 28, while adjusting both adjuster screws translates the bottom guide rail 28. Once the adjustment is made by the screw 94, a low profile shoulder bolt 96 can be tightened to lock the adjusted position in place.

Adjustment of the middle guide rail 30 is shown in FIG. 13. In a manner similar to adjustment of the top and bottom guide rails 26 and 28, an adjuster screw 98 is turned to move one end of the middle guide rail 30 into a desired position. Another adjuster screw, not shown, located at the other end of the middle guide rail 30 performs a similar function. Adjusting only one of the adjuster screws yaws the middle guide rail 30, while adjusting both adjuster screws translates the middle guide rail 30. Once the adjustment is made by the screw 98, a low profile shoulder bolt 100 is tightened to lock the adjusted position in place.

The guide rails 26, 28, 30 can be adjusted individually or together to change the deployment angle, yaw, etc. of the screen 22 to fine-tune horizontal translation and ensure deployment at the correct angle.

Figure 14:
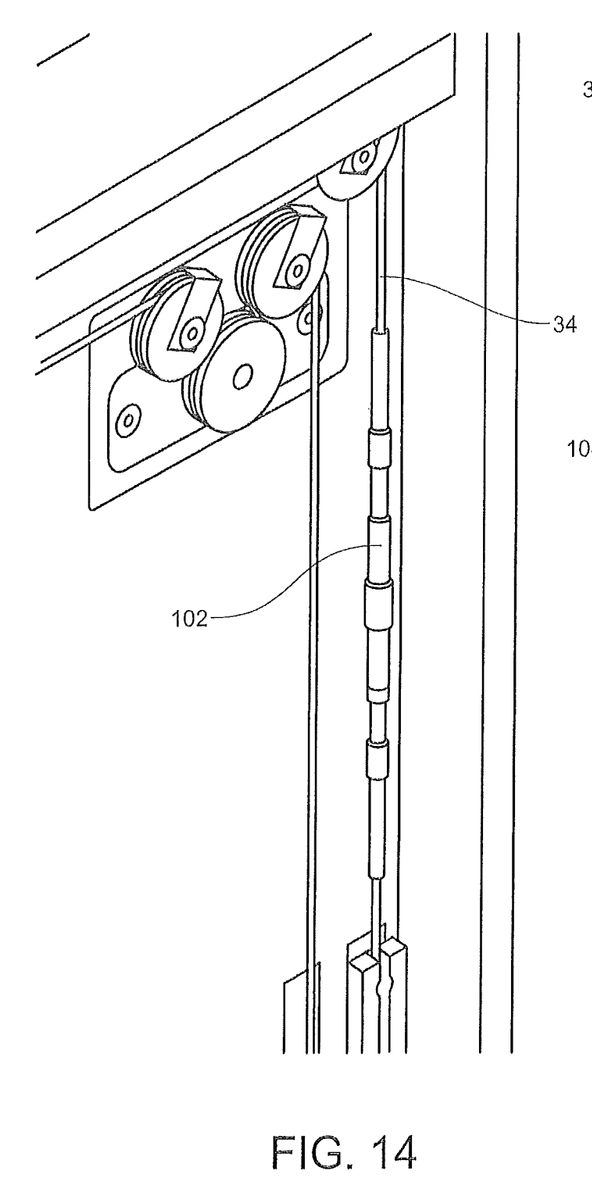
FIG. 14 is a perspective view of cable tensioning and damper assemblies.
Figure 15:
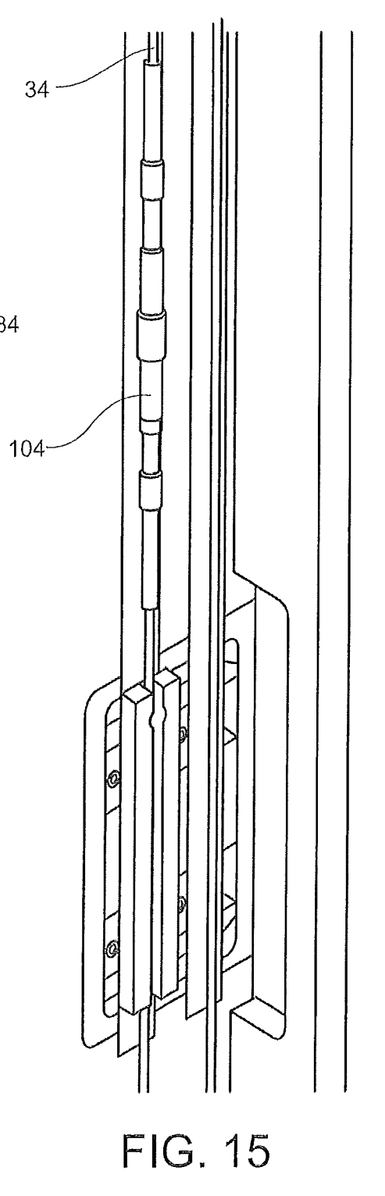
FIG. 15 is a perspective view of the cable tensioner and magnet adjustment block.
Figure 16:
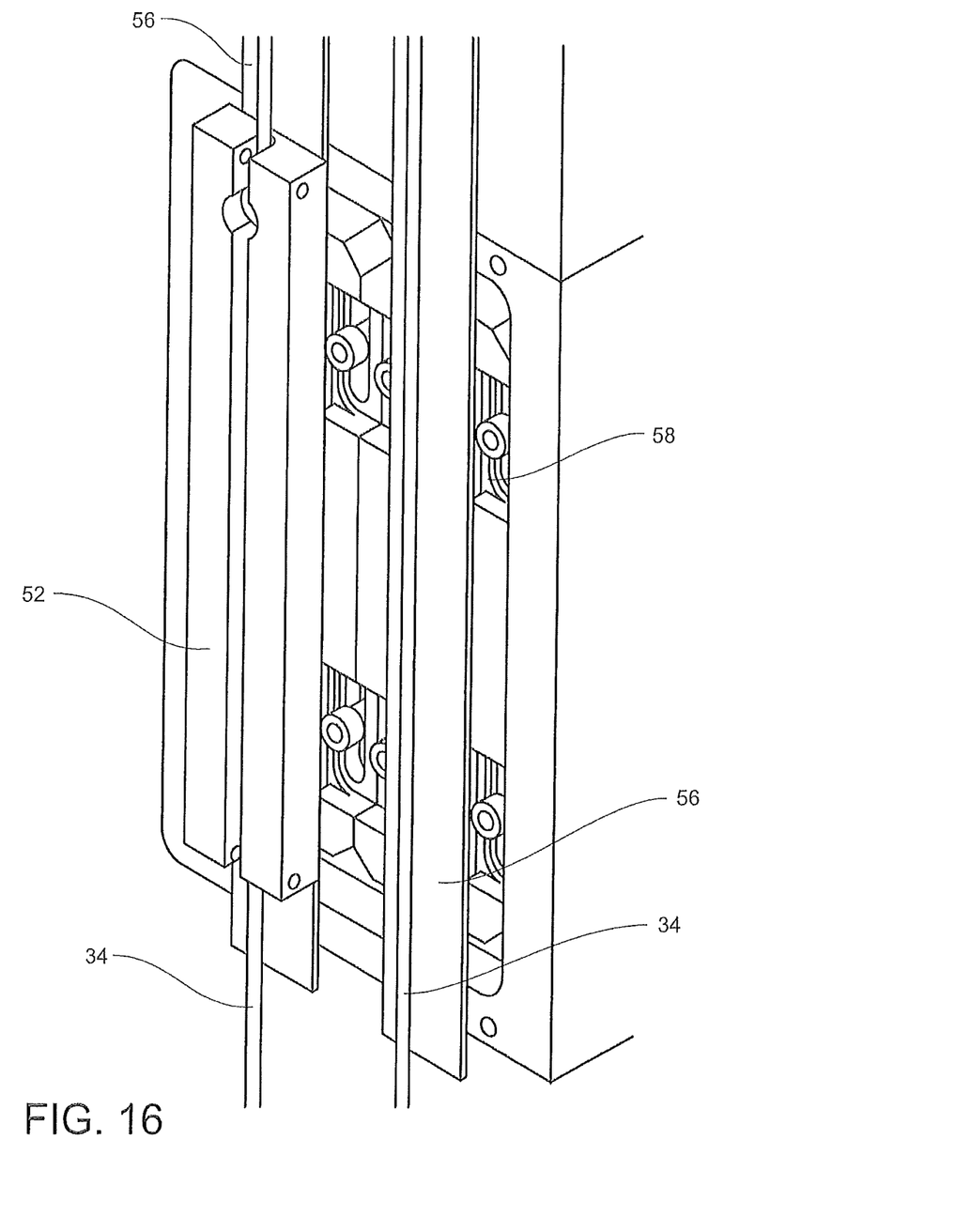
FIG. 16 is a perspective view of the magnet adjustment block showing adjustment thereof.

Referring to FIGS. 14 and 15, cable tension is adjusted by turning turnbuckles 102 and 104 mounted on the cable 34 to increase or decrease tension on the cable 34. FIG. 14 also shows the damper assembly and pulley arrangement thereof including three vertically-oriented pulleys wherein the cable 34 is routed over a first end pulley, under a middle pulley, and over a second end pulley. Details of the magnet system 42 and adjustment of the screen 22 in the stowed and deployed positions are shown in FIG. 16.

Figure 17:
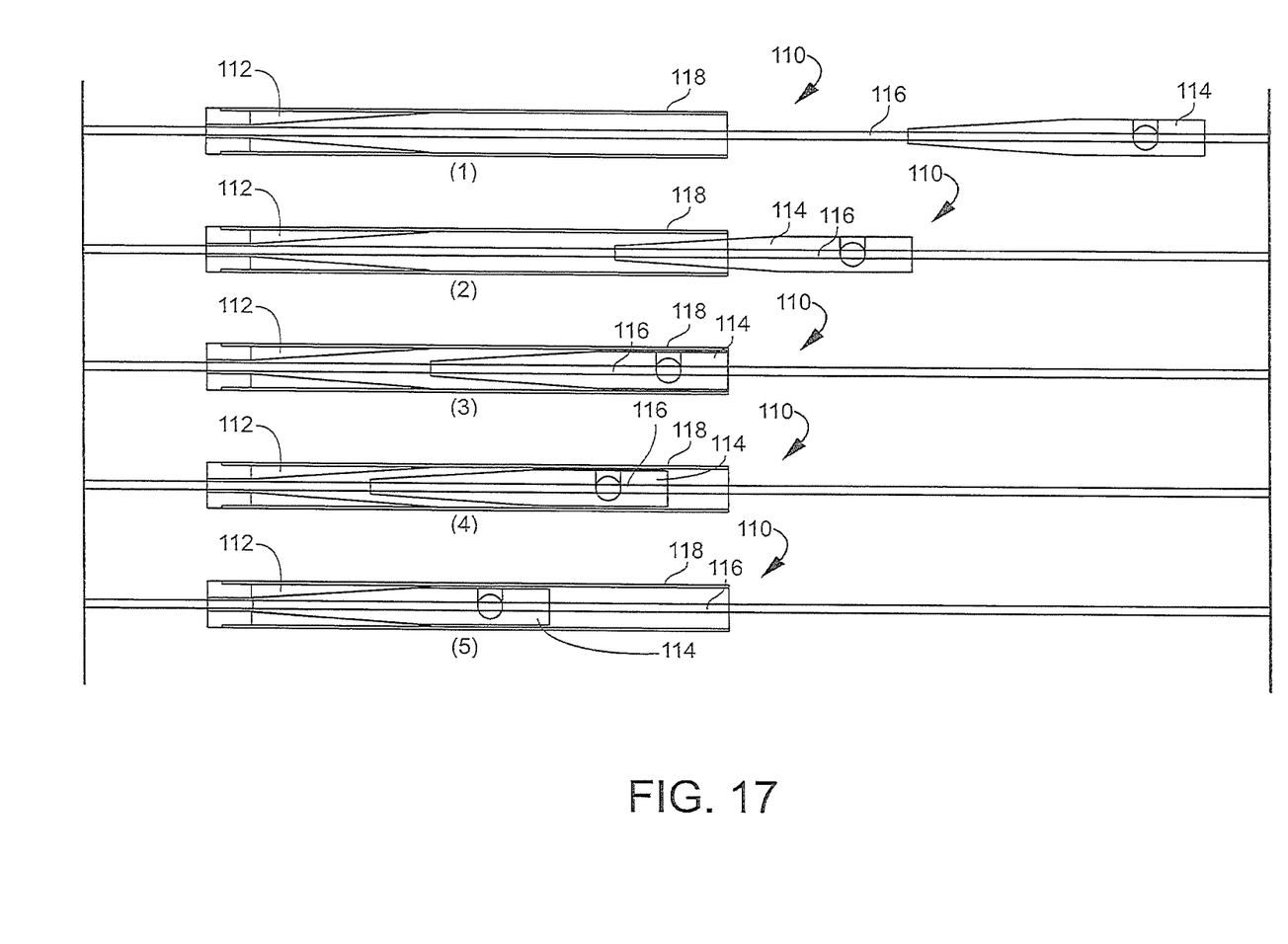
FIG. 17 shows sequential views of conical magnet arrangement.

FIG. 17 illustrates an alternative magnet system 110 utilizing a stationary, female conical magnet 112 and a movable, male conical magnet 114 mounted on a cable 116. The stationary magnet 112 is mounted in a tubular guide 118 through which the cable 116 passes. As shown in the sequential views of FIG. 17, the magnet 114 in its unguided, partially guided and fully guided positions, views (1), (2) and (3), not engaging the stationary magnet 112, is not influenced by the stationary magnet 112. As the magnet 114 moves into the stationary magnet 112, it is increasingly attracted to the stationary magnet 114, view (4), until it is fully engaged with the stationary magnet 114, view (5).

While the damper system 32 is always limiting the speed of the screen 22, as the screen 22 nears the stowed position, the magnets begin to attract each other, thereby creating a force that moves the screen 22 into the fully stowed position. The combination of the force and the damper create an automatic soft close feature.

An aircraft passenger suite privacy screen control apparatus and method is described above. Various details of the invention may be changed without departing from its scope. Furthermore, the foregoing description of the preferred embodiment of the invention and the best mode for practicing the invention are provided for the purpose of illustration only and not for the purpose of limitation, the invention being defined by the claims.

What is claimed is:

1. A screen control apparatus, comprising:
   a screen movable between a stowed position within a pocket and a deployed position outside of the pocket;
   at least one guide roller carried on the screen arranged to travel along at least one guide rail mounted in the pocket;
   a cable routed around a plurality of pulleys rotatably mounted within the pocket, the cable secured to the screen;
   a magnet assembly including a stationary magnet mounted within the pocket and a moveable magnet carried on the cable, the moveable magnet movable into and out of magnetic attraction with the stationary magnet as the screen moves between the stowed and deployed positions, the moveable magnet shaped to engage the stationary magnet with increasing magnetic attraction as the moveable magnet further engages the stationary magnet, the stationary magnet being a female conical-shaped magnet and the moveable magnet being a male conical-shaped magnet mounted on the cable, and the stationary magnet being mounted in a tubular guide through which the cable passes; and a damper assembly mounted within the pocket operable for controlling cable velocity.

2. The screen control apparatus according to claim 1, wherein the pocket is located within a wall of an aircraft passenger suite, the pocket having a vertical opening facing across an entrance to the passenger suite.

3. The screen control apparatus according to claim 1, wherein the at least one guide roller comprises a top roller rotatably mounted proximate a top of the screen and a bottom roller rotatably mounted proximate a bottom of the screen, the top roller arranged to travel along a top guide mounted within the pocket above the screen, and the bottom roller arranged to travel along a bottom guide mounted within the pocket below the screen.

4. The screen control apparatus according to claim 3, wherein the at least one guide roller further comprises a middle roller rotatably mounted proximate a face of the screen, the middle roller arranged to travel along a middle guide mounted within the pocket between the top and bottom guides.

5. The screen control apparatus according to claim 1, wherein the at least one guide rail is an elongate linear member adjustable at one or both ends to adjust at least one of screen position and trajectory.

6. The screen control apparatus according to claim 1, further comprising a top cable block securing the cable to the screen proximate a top of the screen, and a bottom cable block securing the cable to the screen proximate a bottom of the screen, the top and bottom cable blocks moveable with the screen.

7. The screen control apparatus according to claim 1, further comprising a glide sheet arranged between the stationary magnet and the moveable magnet, the glide sheet having a wear surface controlling a distance between the moveable magnet and the stationary magnet.

8. The screen control apparatus according to claim 1, wherein the cable comprises an in-line turnbuckle for adjusting cable tension.

9. The screen control apparatus according to claim 1, wherein the damper assembly comprises a plurality of pulleys around which the cable is routed along a non-linear pathway.

10. The screen control apparatus according to claim 1, wherein the screen is a door, shade, window, or any other rigid or flexible structure adapted to slide between stowed and deployed positions.

11. An aircraft passenger suite, comprising:
a plurality of walls;
an entrance located between spaced ones of the plurality of walls;
a pocket located within one of the plurality of walls, the pocket having a vertical opening facing across the entrance;
a screen movable between a stowed position within the pocket and a deployed position outside of the pocket;
at least one guide roller carried on the screen arranged to travel along at least one guide rail mounted in the pocket;
a cable routed around a plurality of pulleys rotatably mounted within the pocket, the cable secured to the screen;
a magnet assembly including a stationary magnet mounted within the pocket and a moveable magnet carried on the cable, the moveable magnet movable into and out of magnetic attraction with the stationary magnet as the screen moves between the stowed and deployed positions, the moveable magnet shaped to engage the stationary magnet with increasing magnetic attraction as the moveable magnet further engages the stationary magnet, the stationary magnet being a female conical-shaped magnet and the moveable magnet being a male conical-shaped magnet mounted on the cable, and the stationary magnet being mounted in a tubular guide through which the cable passes; and
a damper assembly mounted within the pocket operable for controlling cable velocity.

12. The aircraft passenger suite according to claim 11, wherein the at least one guide roller comprises a top roller rotatably mounted proximate a top of the screen and a bottom roller rotatably mounted proximate a bottom of the screen, the top roller arranged to travel along a top guide mounted within the pocket above the screen, and the bottom roller arranged to travel along a bottom guide mounted within the pocket below the screen.

13. The aircraft passenger suite according to claim 12, wherein the at least one guide roller further comprises a middle roller rotatably mounted proximate a face of the screen, the middle roller arranged to travel along a middle guide mounted within the pocket between the top and bottom guides.

14. The aircraft passenger suite according to claim 11, wherein the at least one guide rail is an elongate linear member adjustable at one or both ends to adjust at least one of screen position and trajectory.

15. The aircraft passenger suite according to claim 11, further comprising a top cable block securing the cable to the screen proximate a top of the screen, and a bottom cable block securing the cable to the screen proximate a bottom of the screen, the top and bottom cable blocks moveable with the screen.

16. The aircraft passenger suite according to claim 11, further comprising a glide sheet arranged between the stationary magnet and the moveable magnet, the glide sheet having a wear surface controlling a distance between the moveable magnet and the stationary magnet.

17. The aircraft passenger suite according to claim 11, wherein the cable comprises an in-line turnbuckle for adjusting cable tension.

18. The aircraft passenger suite according to claim 11, wherein the damper assembly comprises a plurality of pulleys around which the cable is routed along a non-linear pathway.

* * * * *